US012598073B2

(12) United States Patent
Ma et al.

(10) Patent No.: US 12,598,073 B2
(45) Date of Patent: Apr. 7, 2026

(54) DISPLAY TERMINAL, SERVER AND INFORMATION SECURITY ISSUING SYSTEM

(71) Applicant: BOE TECHNOLOGY GROUP CO., LTD., Beijing (CN)

(72) Inventors: Xitong Ma, Beijing (CN); Lihua Geng, Beijing (CN); Youxiang Xia, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 227 days.

(21) Appl. No.: 18/687,368

(22) PCT Filed: Jul. 27, 2022

(86) PCT No.: PCT/CN2022/108129
§ 371 (c)(1),
(2) Date: Feb. 28, 2024

(87) PCT Pub. No.: WO2024/020828
PCT Pub. Date: Feb. 1, 2024

(65) Prior Publication Data
US 2024/0372725 A1 Nov. 7, 2024

(51) Int. Cl.
*H04L 9/32* (2006.01)
*G06F 21/60* (2013.01)

(52) U.S. Cl.
CPC .......... *H04L 9/3226* (2013.01); *G06F 21/602* (2013.01)

(58) Field of Classification Search
CPC ........ H04L 9/3226; H04L 9/32; G06F 21/602
See application file for complete search history.

(56) References Cited

U.S. PATENT DOCUMENTS

| | | | |
|---|---|---|---|
| 11,127,010 B2 * | 9/2021 | Cho | G06Q 20/3229 |
| 2016/0105290 A1 * | 4/2016 | Khalil | H04L 63/0815 713/168 |

(Continued)

FOREIGN PATENT DOCUMENTS

| | | |
|---|---|---|
| CN | 101459559 B | 5/2011 |
| CN | 107636662 A | 1/2018 |

(Continued)

*Primary Examiner* — Abiy Getachew
(74) *Attorney, Agent, or Firm* — HOUTTEMAN LAW LLC

(57) ABSTRACT

A display terminal, a server and an information security issuing system are provided. The display terminal includes a monitoring module and a display module. The monitoring module includes: a file request unit configured to receive a device authentication result sent by the server and send a file issuing request to the server when the device authentication result indicates that the display terminal is successfully authenticated; an identity authentication unit configured to receive an encrypted authentication file issued by the server according to the file issuing request, and authenticate identity information of data content in the encrypted authentication file; the display module is configured to display the data content in the encrypted authentication file when the identity authentication is passed; and a content authentication unit configured to determine whether the data content is correct based on a first image displayed by the display module.

16 Claims, 5 Drawing Sheets

(56)          References Cited

U.S. PATENT DOCUMENTS

2019/0207756 A1 *   7/2019   Vass ...................... H04L 9/0863
2020/0092272 A1 *   3/2020   Eisen .................. H04L 63/0869

FOREIGN PATENT DOCUMENTS

| | | | |
|---|---|---|---|
| CN | 110896400 | A | 3/2020 |
| CN | 111489045 | A | 8/2020 |
| CN | 111600392 | A | 8/2020 |
| CN | 113641981 | A | 11/2021 |
| CN | 113342620 | B | 12/2023 |
| JP | 2008061178 | A | 3/2008 |
| JP | 2021150704 | A | 9/2021 |

* cited by examiner

DISPLAY TERMINAL, SERVER AND INFORMATION SECURITY ISSUING SYSTEM

TECHNICAL FIELD

The present disclosure relates to the field of information detection technology, in particular to a display terminal, a server and an information security issuing system.

BACKGROUND

With the rapid development of computer technology, information is transmitted through the internet in more and more diversified forms. For example, videos, files or information are issued to a specific device by using a communication tool. However, the information is easily tampered by illegal personnel in the transmission process, or an illegal device is introduced to display the issued information, and the like, which threatens the security of information issuing.

SUMMARY

The present disclosure is directed to at least solve one of the technical problems in the prior art, and provides a display terminal, a server and an information security issuing system, which can effectively solve the security problems in the information issuing process.

In a first aspect, the embodiments of the present disclosure provide a display terminal, including a monitoring module and a display module; wherein the monitoring module includes a file request unit, an identity authentication unit and a content authentication unit; the file request unit is configured to receive a device authentication result sent by the server and send a file issuing request to the server in response to the device authentication result indicating that the display terminal is successfully authenticated; the identity authentication unit is configured to receive an encrypted authentication file issued by the server according to the file issuing request, and authenticate identity information of data content in the encrypted authentication file; the display module is configured to display the data content in the encrypted authentication file in response to the identity authentication being passed; and the content authentication unit is configured to determine whether the data content is correct based on a first image displayed by the display module.

In some embodiments, the identity authentication unit includes a first decryption sub-unit, a first processing sub-unit, and a character comparison sub-unit; the first decryption sub-unit is configured to receive the encrypted authentication file, and decrypt the encrypted authentication file by using a pre-stored first encryption and decryption key to obtain a decrypted authentication file; the decrypted authentication file includes the data content and first character information; the first processing sub-unit is configured to process the data content through a preset algorithm to obtain second character information corresponding to the data content; and the character comparison sub-unit is configured to compare the first character information with the second character information, and determine whether the identity information of the data content in the encrypted authentication file passes the authentication according to a comparison result.

In some embodiments, the display terminal further includes a first processing unit and an image sensor integrated on the display module; the image sensor is configured to acquire a sub-image in a first preset region of the first image displayed by the display module displayed; and the first processing unit is configured to receive the data content sent by the identity authentication unit and send the data content to the display module for display.

In some embodiments, the content authentication unit includes a first receiving sub-unit and a content authentication sub-unit; the first receiving sub-unit is configured to receive the sub-image sent by the image sensor; and the content authentication sub-unit is configured to verify the display information of the sub-image according to pre-stored verification information and determine whether the data content is correct.

In some embodiments, the display terminal further includes a second processing unit; the second processing unit is configured to determine a first authority for granting the user to start or close the display terminal in response to a user authorization request initiated by a user storage device, send pre-stored user ciphertext information to the server, and determine a second authority for granting the user to operate a preset function of the display terminal in response to a password input by the user being matched with a preset authorized password; and the display module is further configured to display a password input window in response to the user storage device initiating the user authorization request; and display the password input by the user in response to the input operation of the user.

In some embodiments, the monitoring module further includes a charging unit, a battery and a communication unit; the charging unit is configured to charge the battery; the battery is configured to supply power to the image sensor, the file request unit, the identity authentication unit, the content authentication unit and the communication unit in the display terminal; and the communication unit is configured to communicate with the server.

In some embodiments, the display terminal further includes a device authentication request unit; and the device authentication request unit is configured to transmit a device authentication request to the server in response to the received device authentication information indicating that the authentication of the display terminal is failed; the device authentication request carries device ciphertext information of the display terminal.

In a second aspect, the embodiments of the present disclosure further provide a server, including a device authentication unit, a file encryption unit, and a content monitoring unit; wherein the device authentication unit is configured to perform a device authentication on a display terminal in response to a device authentication request sent by the display terminal to obtain a device authentication result, and feed the device authentication result back to the display terminal; the file encryption unit is configured to encrypt a target file to be issued in response to a file issuing request sent by the display terminal to obtain an encrypted authentication file; and the content monitoring unit is configured to receive an authentication result of a data content sent by the display terminal and monitor whether the data content is correct.

In some embodiments, the server further includes a device registration unit; the device registration unit includes a second receiving sub-unit, a type selection sub-unit and a first encryption sub-unit; the second receiving sub-unit is configured to receive a first device identifier and a device type of a terminal to be registered; the type selection sub-unit is configured to determine a device authentication type selected by a user; and the first encryption sub-unit is configured to encrypt the first device identifier, the device type and the device authentication type by using a pre-stored second encryption and decryption key to obtain device ciphertext information, serve the terminal to be registered as a registered display terminal, and send the device ciphertext information to the registered display terminal for storage.

In some embodiments, the device authentication unit includes a second decryption sub-unit and an identifier comparison sub-unit; the second decryption sub-unit is configured to extract the device ciphertext information carried in the device authentication request in response to the device authentication request sent by the display terminal, and decrypt the device ciphertext information by using the second encryption and decryption key to obtain a second device identifier of the display terminal; and the identifier comparison sub-unit is configured to compare the second device identifier with the pre-stored first device identifier of the registered display terminal to obtain a device authentication result, and feed the device authentication result back to the display terminal.

In some embodiments, the file encryption unit includes a labeling sub-unit, a second processing sub-unit, and a second encryption sub-unit; the device registration unit further includes a key generation sub-unit; the key generation sub-unit is configured to generate a first encryption and decryption key according to the first device identifier of the registered display terminal, and send the first encryption and decryption key to the registered display terminal for storage; the labeling sub-unit is configured to replace display information in a second preset region of each frame of a second image in the file to be issued with verification information in response to the file issuing request sent by the display terminal, and serve the replaced file to be issued as a target file; the second processing sub-unit is configured to process the target file through a preset algorithm to obtain first character information corresponding to the target file; and the second encryption sub-unit is configured to encrypt the first character information and the target file by using the pre-stored first encryption and decryption key to generate an encrypted authentication file.

In some embodiments, the server further includes a user registration unit; the user registration unit includes a third receiving sub-unit and a third encryption sub-unit; the third receiving sub-unit is configured to receive a first authorization identifier of a user to be registered; the first authorization identifier includes an identifier of a user storage device; and the third encryption sub-unit is configured to encrypt the first authorization identifier by using a pre-stored third encryption and decryption key to obtain user ciphertext information, and send the user ciphertext information to the display terminal for storage.

In some embodiments, the server further includes a password generation unit; the password generation unit includes a fourth receiving sub-unit, a third decryption sub-unit and a password sending sub-unit; the fourth receiving sub-unit is configured to receive the user ciphertext information sent by the display terminal; the third decryption sub-unit is configured to decrypt the user ciphertext information by using the third encryption and decryption key to obtain a second authorization identifier; and the password sending sub-unit is configured to match the second authorization identifier with the registered first authorization identifier, and send a preset authorization password to a user who succeeds in matching.

In a third aspect, the embodiment of the present disclosure further provides an information security issuing system, including the display terminal and the server described above; wherein the display terminal includes the monitoring module and the display module; the monitoring module includes the file request unit, the identity authentication unit and the content authentication unit; the server includes the device authentication unit, the file encryption unit and the content monitoring unit; the device authentication unit is configured to perform the device authentication on the display terminal in response to the device authentication request sent by the display terminal to obtain the device authentication result, and send the device authentication result to the file request unit; the file request unit is configured to receive the device authentication result sent by the device authentication unit and send the file issuing request to the file encryption unit in response to the device authentication result indicating that the display terminal is successfully authenticated; the file encryption unit is configured to encrypt the target file to be issued in response to the file issuing request sent by the file request unit to obtain the encrypted authentication file; the identity authentication unit is configured to receive the encrypted authentication file issued by the file encryption unit according to the file issuing request, and authenticate the identity information of the data content in the encrypted authentication file; the display module is configured to display the data content in response to the identity authentication being passed; the content authentication unit is configured to determine whether the data content is correct based on the first image displayed by the display module; and the content monitoring unit is configured to receive the authentication result of the data content sent by the content authentication unit and monitor whether the data content is correct.

In some embodiments, the file encryption unit includes the labeling sub-unit, the second processing sub-unit, and the second encryption sub-unit; and the identity authentication unit includes the first decryption sub-unit, the first processing sub-unit and the character comparison sub-unit; the labeling sub-unit is configured to replace the display information, in the second preset region, of each frame of the second image in the file to be issued with the pre-stored verification information in response to the file issuing request sent by the file request unit, and serve the replaced file to be issued as the target file; the second processing sub-unit is configured to process the target file through the preset algorithm to obtain first character information corresponding to the target file; the second encryption sub-unit is configured to encrypt the first character information and the target file by using the pre-stored first encryption and decryption key to generate the encrypted authentication file; the first decryption sub-unit is configured to receive the encrypted authentication file, and decrypt the encrypted authentication file by using the first encryption and decryption key to obtain the decrypted authentication file; the decrypted authentication file includes the data content and the first character information; the first processing sub-unit is configured to process the data content through the preset algorithm to obtain the second character information corresponding to the data content; and the character comparison sub-unit is configured to compare the first character information with the second character information, and determine whether the identity information of the data content passes the authentication according to the comparison result.

In some embodiments, the information security issuing system further includes the user storage device; the user storage device is in communication connection with the display terminal and is configured to initiate the user authorization request to the display terminal.

DETAIL DESCRIPTION OF EMBODIMENTS

Figure 1:
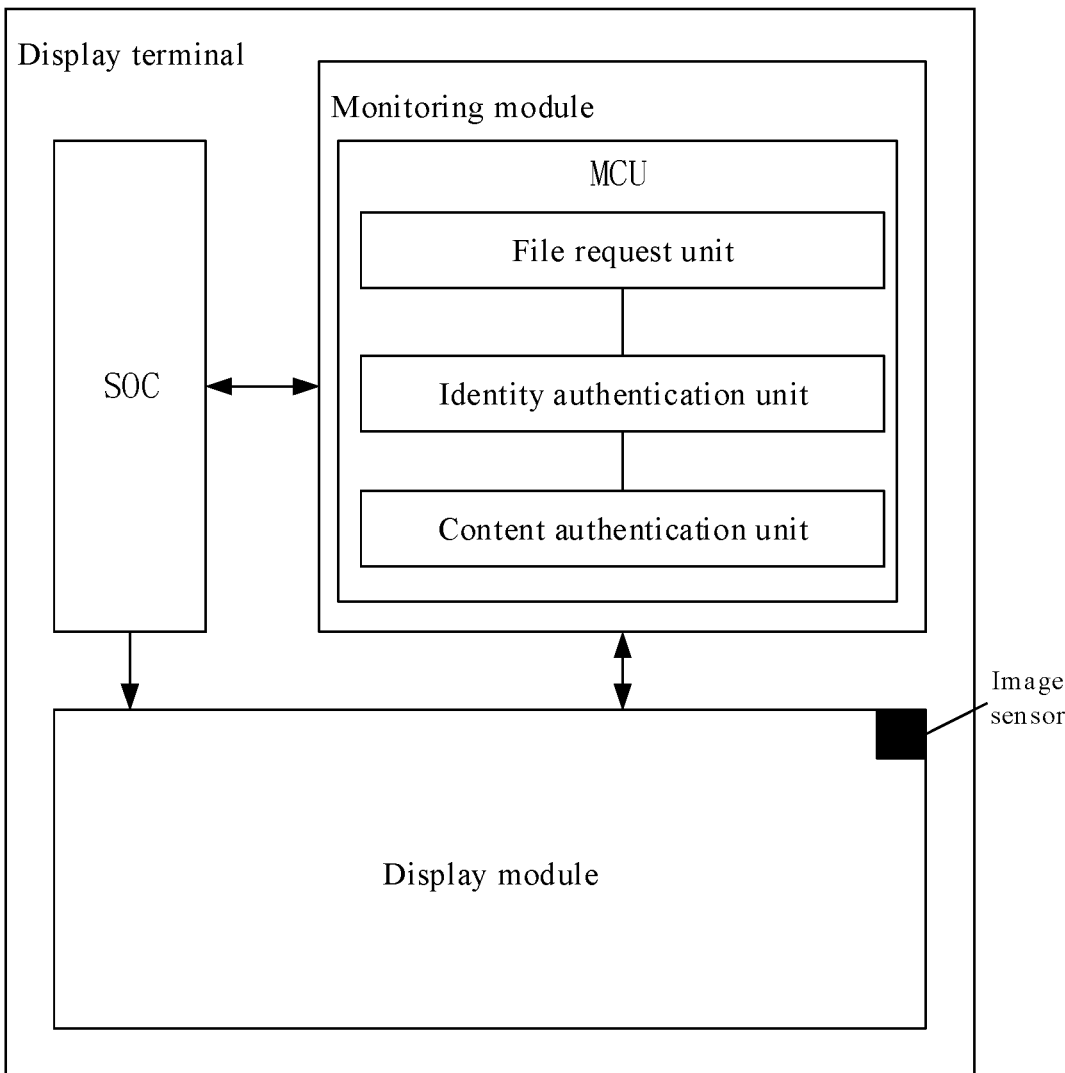
FIG. 1 is a schematic diagram of a structure of a display terminal according to an embodiment of the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few, not all of, embodiments of the present disclosure. Components of the embodiments of the present disclosure, as generally described and illustrated in the drawings herein, could be arranged and designed in a wide variety of different configurations. Thus, the following detailed description of the embodiments of the present disclosure in the drawings is not intended to limit the protective scope of the present disclosure, but is merely representative of selected embodiments of the present disclosure. All other embodiments, which can be derived by a person skilled in the art from the embodiments of the present disclosure without any creative effort, are within the protective scope of the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Reference to "more or some" in the present disclosure means two or more. A term "and/or" describes an association relationship of associated objects, indicating that there may be three relationships. For example, A and/or B may indicate: A exists alone, A and B exist simultaneously, and B exists alone. A character "/" generally indicates that associated objects before and after the character "/" are in an "or" relationship.

In a first aspect, FIG. 1 is a schematic diagram of a structure of a display terminal according to an embodiment of the present disclosure. As shown in FIG. 1, the display terminal includes a monitoring module and a display module. The monitoring module includes a file request unit, an identity authentication unit and a content authentication unit which are integrated on a microcontroller unit (MCU).

Various technical loopholes exist in the related art, so that potential safety hazards exist in the information transmission process. For example, files are tampered with, and identity information of a display terminal is counterfeited. In view of the above problems in the related art, the process of implementing information security issuing in the embodiment of the present disclosure includes three authentication stages, namely, a device authentication stage, an identity authentication stage, and a content authentication stage, where the display terminal implements authentication of identity information of a transmitted file by using an identity authentication unit in the identity authentication stage; and implements authentication of a content of the transmitted file by using a content authentication unit in the content authentication stage. It should be noted that a file request unit of the display terminal is only used for sending a file issuing request to a server when a device authentication result indicates that the display terminal is successfully authenticated, so that it can be ensured that the display terminal for receiving the transmitted file is a display terminal which passes an device authentication.

A specific implementation of the information security issuing implemented by the display terminal will be described below in detail.

The file request unit is configured to receive the device authentication result sent by the server and send the file issuing request to the server when the device authentication result indicates that the display terminal is successfully authenticated. Here, the device authentication result is an authentication result indicating that the device authentication has been performed on the display terminal on the server side. The device authentication includes detecting the identity information of the display terminal, specifically, verifying a device identity document (ID) of the display terminal, and determining whether the display terminal is a registered display terminal. The device authentication result may be information indicating that the identity authentication of the display terminal is passed or that the identity authentication of the display terminal is failed. In a case that the device authentication result indicates that the identity authentication of the display terminal is passed, the file request unit sends the file issuing request to the server.

The identity authentication unit is configured to receive an encrypted authentication file issued by the server according to the file issuing request, and authenticate identity information of data content in the encrypted authentication file. The encrypted authentication file is an encrypted file, and needs to be decrypted by using a specific key to obtain the data content and summary information. The identity information of the data content is authenticated according to the summary information.

It should be noted that the summary information is only used to represent the identity information of the data content that has not been tampered with; the identity information includes attribute information such as a name, a size, and a file type (including a picture, a video, a special effect, and the like) of a file corresponding to the data content. The summary information may specifically be a hash value obtained by performing a hash operation on the data content that has not been tampered with; or a coded value obtained by performing a specific coding on the data content which is not tampered with, which may be set according to actual scenes in the embodiments of the present disclosure.

Taking a video as the data content for example, if attribute information of the video is tampered with (a video picture is not tampered with), the identity information of the data content is changed, that is, some attribute features of the data content are changed, but the summary information obtained by decryption still represents the identity information of the data content which is not tampered with.

The display module is configured to display the data content in the encrypted authentication file if the identity authentication is passed.

The content authentication unit is configured to determine whether the data content is correct based on a first image displayed by the display module. If the content authentication is passed, it is determined that the actual display information corresponding to the data content is not tampered with.

In some examples, whether the data content is correct or not is determined according to a similarity between a pre-stored standard image and the first image, if the similarity is higher, it is considered that the actual display information corresponding to the data content is not tampered with, that is, the content authentication is passed. Alternatively, whether the data content is correct or not is determined by detecting whether the first image has a preset tag, and if the first image has the preset tag, it is considered that the actual display information corresponding to the data content is not tampered with, that is, the content authentication is passed.

According to the display terminal provided by the embodiment of the present disclosure, on one hand, the file request unit ensures that the display terminal for receiving the transmitted file is the display terminal which passes the device authentication, so that some illegal display terminals are prevented from receiving the file transmitted by the server; on the other hand, the identity authentication unit realizes the authentication of the identity information of the transmitted file, so that the basic attribute characteristics of the transmitted file are prevented from being tampered with; on the other hand, the content authentication unit realizes the authentication of the content of the transmitted file, so that the actual display information of the transmitted file on the display module is prevented from being tampered with. Therefore, the display terminal provided by the embodiment of the present disclosure can effectively solve the safety problems in the information issuing process by monitoring in multiple aspects in the information transmission process.

In some examples, in the identity authentication phase, the authentication of the identity information of the transmitted file is realized through the identity authentication unit. Specifically, the identity authentication unit includes a first decryption sub-unit, a first processing sub-unit and a character comparison sub-unit. The first decryption sub-unit is configured to receive the encrypted authentication file, and decrypt the encrypted authentication file by using a first encryption and decryption key stored in advance to obtain a decrypted authentication file. The decrypted authentication file includes the data content and first character information. The first processing sub-unit is configured to process the data content through a preset algorithm to obtain second character information corresponding to the data content. The character comparison sub-unit is configured to compare the first character information with the second character information, and determine whether the identity information of the data content passes the authentication or not according to a comparison result.

Here, the first encryption and decryption key is generated by the server, the encrypted authentication file is obtained by the server through encryption by using the first encryption and decryption key. The embodiment of the present disclosure uses a symmetric encryption algorithm, such as advanced encryption standard (AES), and the encryption key is also used as the decryption key, so that the server loads the generated first encryption and decryption key into the MCU for storage, so as to provide the encrypted authentication file to be decrypted in the decryption stage. Based on this, in the identity authentication stage, the first decryption sub-unit decrypts the encrypted authentication file by using the pre-stored first encryption and decryption key, so as to obtain the decrypted authentication file.

The decrypted authentication file includes the data content and the first character information. The data content may be data information such as videos, pictures, animation special effects and the like; the first character information may be character information generated by processing, by the server, the data content that is not tampered with by using a preset algorithm, and then be encrypted together with the data content that is not tampered with to obtain the encrypted authentication file. However, during transmission of the encrypted authentication file, the data content is likely to be tampered with, and the first character information in the encrypted authentication file is not tampered with, so that the data content in the encrypted authentication file is authenticated by using the first character information in the identity authentication stage.

Because the data content in the encrypted authentication file is at risk of being tampered with, the first processing sub-unit is configured to process the data content through a preset algorithm to obtain the second character information corresponding to the data content, and the second character information is used for representing identity information of the data content in the encrypted authentication file. Then, the character comparison sub-unit compares the first character information with the second character information, and determines whether the first character information and the second character information are the same. If the first character information and the second character information are the same, it is determined that the identity information of the data content passes the authentication; if not, it is determined that the identity information of the data content fails the authentication.

Taking the preset algorithm as an SHA-256 algorithm as an example, the server performs the SHA-256-based calculation on the data content which is not tampered with, so as to obtain a hash value S1, that is, the first character information. The first processing sub-unit performs the SHA-256-based calculation on the data content in the encrypted authentication file to obtain a hash value S2, that is, the second character information. The character comparison sub-unit compares the hash value S1 with the hash value S2. If the hash value S1 is the same as the hash value S2, it is determined that the identity information of the data content passes the authentication; if the hash value S1 is different from the hash value S2, it is determined that the identity information of the data content fails the authentication.

As shown in FIG. 1, the display terminal further includes a system on chip (SOC) and an image sensor integrated on the display module. A first processing unit and a second processing unit are integrated on the SOC.

In some examples, the image sensor is configured to acquire a sub-image, displayed in a first preset region, of the first image displayed by the display module; the first processing unit is configured to receive the data content sent by the identity authentication unit and send the data content to the display module for display.

Here, the first preset region may be a preset fixed region located on the display module. The image sensor is attached to a surface of the display module at the position corresponding to the first preset region. The display module is a screen of the display terminal.

In some examples, in the content authentication stage, content authentication of the data content is achieved by the content authentication unit. In particular, the content authentication unit includes a first receiving sub-unit and a content authentication sub-unit. The first receiving sub-unit is configured to receive the sub-image transmitted by the image sensor; the content authentication sub-unit is configured to verify the display information of the sub-image according to pre-stored verification information and determine whether the data content is correct.

Here, the verification information may be a character string or a picture. Specifically, the verification information may be information configured by a user and stored in the MCU; or the verification information may be information generated by the server and loaded and stored in the MCU. The sub-image contains preset information for verifying the display content of the display module, and the preset information is similar to a character string or a picture. The content authentication sub-unit may determine whether the data content displayed by the display module is correct by using a similarity between the verification information and the display information. As an example, the verification information is a picture, the content authentication sub-unit compares a similarity between the verification picture and the sub-image. If the similarity is greater than or equal to a preset threshold, it is determined that the data content displayed by the display module is correct; and if the similarity is smaller than the preset threshold value, it is determined that the data content displayed by the display module is wrong.

In some examples, in order to improve the security of the display information of the display terminal, in the present disclosure, it is necessary to further initiate an identity authentication of the user (i.e., a user identity authentication), so as to ensure that only an authorized user has operation authority for the display terminal, so that the problem that the information displayed by the display terminal is tampered with can be avoided.

The second processing unit is configured to determine a first authority for granting the user to start or close the display terminal in response to a user authorization request initiated by a user storage device; determine a second authority for granting the user to operate the preset function of the display terminal when a password input by the user is matched with a preset authorized password. The display module is further configured to display a password input window when the user storage device initiates the user authorization request; and display the password input by the user in response to the input operation of the user.

Here, the user storage device may be a UKey. The UKey is a reliable, high-speed and small storage device that is directly connected to a computer through a universal serial bus (USB) interface, and has a password validation function. The first authority is an authority for starting or closing the display terminal. Because the authority for starting and closing the display terminal is lower, the authority for starting and closing the display terminal may be granted as long as the user initiates the user authorization request. The second authority is an authority for operating some functions of the display terminal, which is set for the user in advance. For example, the second authority may include a display channel selection authority, a content play/pause authority, a volume adjustment authority, a screen brightness adjustment authority, and the like.

When detecting that a user inserts a UKey, the second processing unit grants the first authority to the user corresponding to the UKey; and control the display module to display the password input window, wherein the password input window supports the input of information by a user. The display module displays the password input by the user in response to the input operation of the user.

Figure 2:
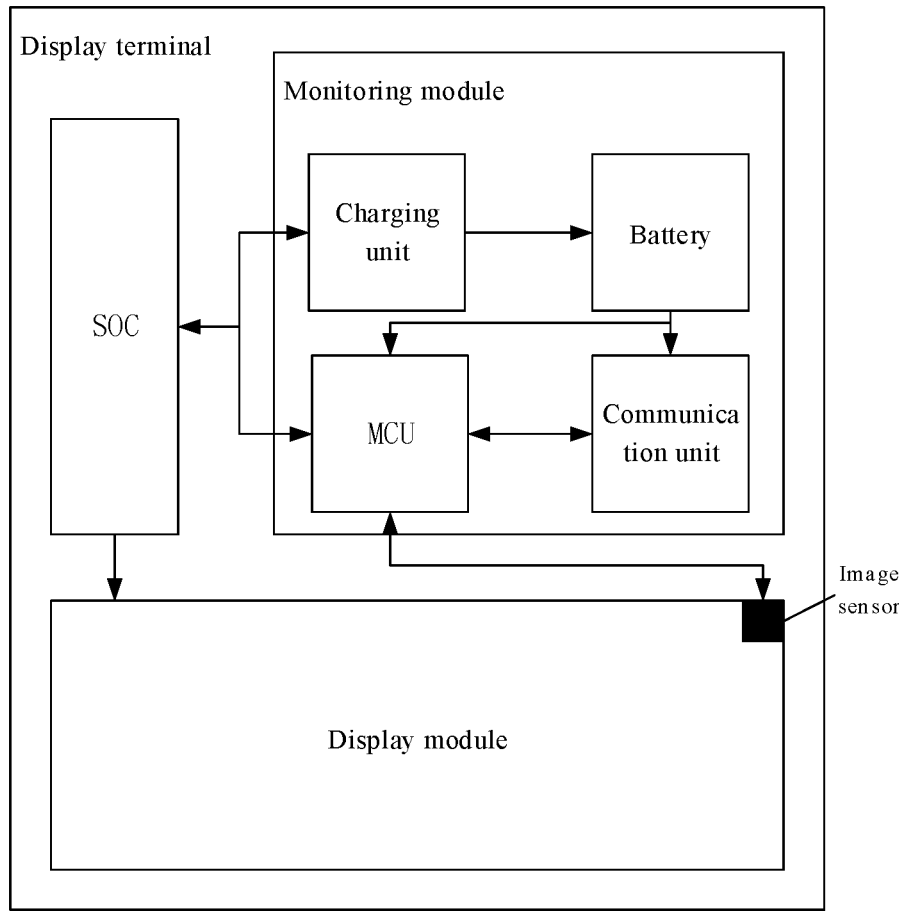
FIG. 2 is a schematic diagram of a specific structure of a display terminal according to an embodiment of the present disclosure.

In some examples, FIG. 2 is a schematic diagram of a specific structure of a display terminal according to an embodiment of the present disclosure. As shown in FIG. 2, the monitoring module further includes a charging unit, a battery, and a communication unit; the charging unit is configured to charge the battery; the battery is configured to supply power to the image sensor, the MCU (i.e., the file request unit, the identity authentication unit, and the content authentication unit) and the communication unit in the display terminal; the communication unit is configured to communicate with the server, specifically, through a wireless communication technology WiFi.

The monitoring module may be connected to the SOC inside the display terminal through the USB interface; the SOC charges with the charging unit through the SOC USB, and communicates with the charging unit.

Here, the monitoring module provided by the embodiment of the present disclosure adopts an independent power supply system, and is connected to the display terminal through the SOC USB, so that an operating state (including the identity authentication and the content authentication of the data content, and an abnormal shutdown) of the display terminal may be monitored in real time, and thus, the display terminal may be widely applied to the field of unattended public display.

In some examples, the display terminal further includes a device authentication request unit; the device authentication request unit is configured to transmit a device authentication request to the server in a case where the received device authentication information indicates that the authentication of the display terminal is failed; the device authentication request carries device ciphertext information of the display terminal.

The display terminal receives the device authentication result issued by the server, and sends the file issuing request to the server by using the file request unit in a case that the device authentication result indicates that the display terminal passes the authentication. In a case where the device authentication information indicates that the authentication of the display terminal is failed, the device authentication request is transmitted to the server by the device authentication request unit.

The device ciphertext information is pre-stored in the MCU, and is specifically generated by the server and loaded into the MCU in the device authentication stage. The device ciphertext information is used for representing the identity information of the display terminal.

Figure 3:
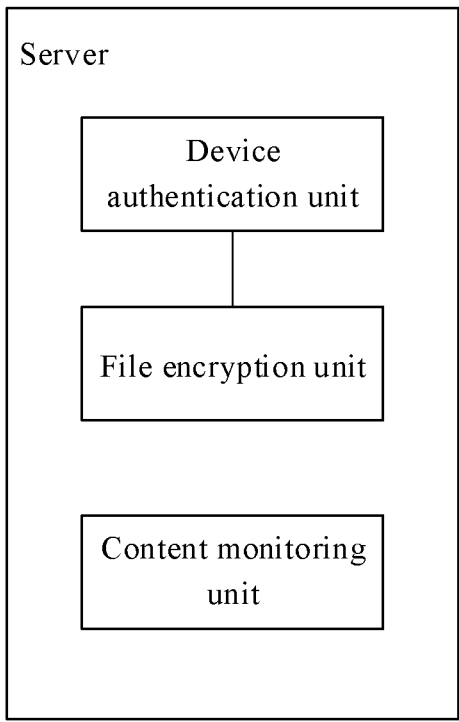
FIG. 3 is a schematic diagram of a server according to an embodiment of the present disclosure.

In a second aspect, based on the same inventive concept, embodiments of the present disclosure further provide a server, which is capable of implementing information interaction with the display terminal. FIG. 3 is a schematic diagram of a server according to an embodiment of the present disclosure. As shown in FIG. 3, the server includes a device authentication unit, a file encryption unit, and a content monitoring unit.

The device authentication unit is configured to perform the device authentication on the display terminal in response to the device authentication request sent by the display terminal, obtain a device authentication result, and feed the device authentication result back to the display terminal.

Specifically, in the device authentication stage, the device authentication unit receives the device authentication request sent by the device authentication request unit of the display terminal, where the device authentication request carries the device ciphertext information of the display terminal, and decrypts the device ciphertext information to obtain the identity information of the display terminal. And then, the pre-stored identity information of the registered display terminal is compared with the decrypted identity information of the current display terminal to obtain the device authentication result, wherein the device authentication result may be information indicating that the display terminal passes the authentication or information indicating that the display terminal fails the authentication. And then, the device authentication result is fed back to the display terminal.

The file encryption unit is configured to encrypt a target file to be issued in response to the file issuing request sent by the display terminal to obtain an encrypted authentication file.

The content monitoring unit is configured to receive an authentication result of the data content sent by the display terminal and monitor whether the data content is correct.

According to the server provided by the embodiment of the present disclosure, the identity authentication is performed on the display terminal for receiving the transmitted file by using the device authentication unit, so that the display terminal for receiving the transmitted file can be ensured to be the display terminal which has passed the device authentication, therefore the transmitted file is prevented from being sent to an illegal display terminal for display. In addition, the server encrypts the target file to be issued, so that secret transmission of information can be achieved. In addition, the content monitoring unit may monitors the data content displayed by the display terminal in real time.

Figure 4:
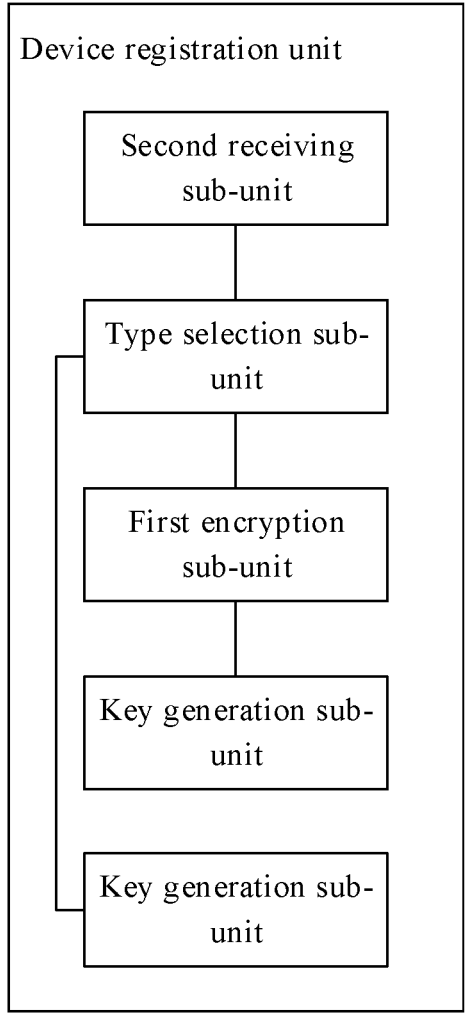
FIG. 4 is a schematic diagram of a structure of a device registration unit according to an embodiment of the present disclosure.

In some examples, FIG. 4 is a schematic diagram of a structure of a device registration unit according to an embodiment of the present disclosure. As shown in FIG. 4, the server further includes a device registration unit; the device registration unit includes a second receiving sub-unit, a type selection sub-unit, and a first encryption sub-unit.

The second receiving sub-unit is configured to receive a first device identifier and a device type of a terminal to be registered; the type selection sub-unit is configured to determine a device authentication type selected by a user; the first encryption sub-unit is configured to encrypt the first device identifier, the device type and the device authentication type by using a pre-stored second encryption and decryption key to obtain the device ciphertext information, serves the terminal to be registered as a registered display terminal, and send the device ciphertext information to the registered display terminal for storage.

The first device identifier may be a device identifier ID of the terminal to be registered, and the device identifier ID may be a unique trusted identifier of an MCU of the terminal to be registered. The first device identifier and the device type are information provided by the user. The device authentication type is an authentication type selected by a user and includes a one-machine-one-secret, a one-type-one-secret, a unified key and the like. The one-machine-one-secret means that the first encryption and decryption key is generated for a single display terminal; the one-type-one-secret means that the first encryption and decryption key is generated for a type of the display terminal; and the unified key means that the first encryption and decryption key is generated for all of the display terminals. The authentication type is not limited in the embodiment of the present disclosure.

Here, the second encryption and decryption key may be a key randomly generated by the server, and the first device identifier, the device type, and the device authentication type are encrypted by using an AES (a kind of the symmetric encryption algorithm) to obtain the device ciphertext information. The terminal to be registered is successfully registered, and is used as a registered display terminal, and the device ciphertext information is loaded into the MCU of the registered display terminal for storage, so that when the display terminal subsequently initiates the device authentication request, the device authentication request carries the device ciphertext information as a condition for the device authentication.

In some examples, the device authentication unit is configured to perform the device authentication in the device authentication stage. Specifically, the device authentication unit includes a second decryption sub-unit and an identifier comparison sub-unit. The second decryption sub-unit is configured to extract the device ciphertext information carried in the device authentication request in response to the device authentication request sent by the display terminal, and decrypt the device ciphertext information by using the second encryption and decryption key to obtain a second device identifier of the display terminal; the identifier comparison sub-unit is configured to compare the second device identifier with the pre-stored first device identifier of the registered display terminal to obtain the device authentication result, and feed the device authentication result back to the display terminal.

Specifically, the second device identifier is compared with the first device identifier of each registered display terminal. If the first device identifier is the same as the second device identifier, the device authentication result indicates that the identity authentication of the display terminal is passed; and if the first device identifier is not the same as the second device identifier, the device authentication result indicates that the identity authentication of the display terminal is failed.

In some examples, as shown in FIG. 4, the device registration unit further includes a key generation sub-unit; the key generation sub-unit is configured to generate the first encryption and decryption key according to the first device identifier of the registered display terminal, and send the first encryption and decryption key to the registered display terminal for storage.

In the present disclosure, the authentication type of one-machine-one-secret is taken as an example for illustration, and the generated first encryption and decryption key is used as a key for subsequently authenticating, by a system, the identity information of the data content in the device registration stage.

Because the first device identifier is the unique trusted identifier of the safe MCU which is not easy to be broken, the unique trusted identifier of the MCU of the monitoring module is used as the key for subsequently authenticating, by the system, the identity information of the data content in the device registration stage, which can greatly improve the security of the identity authentication.

The file is encrypted to generate the encrypted authentication file. Specifically, the file encryption unit includes a labeling sub-unit, a second processing sub-unit and a second encryption sub-unit; the labeling sub-unit is configured to replace display information of each frame of second image, in a second preset region, in the file to be issued with pre-stored verification information in response to the file issuing request sent by the display terminal, and take the replaced file to be issued as a target file. Here, the file to be issued is a file to be sent to the display terminal by the server, that is, a file requested to be displayed by the display terminal, and includes data information such as video, pictures, animation special effects, and the like. The second preset region corresponds to the first preset region of the display module, that is, a sub-image of the second image in the second preset region may be displayed in the first preset region of the display module. The display information of the second image in the second preset region is replaced by the verification information. Specifically, the display information of the second image in the second preset region may be replaced by a character string or a picture in a marking mode. The second processing sub-unit is configured to process the target file through a preset algorithm to obtain the first character information corresponding to the target file. Here, the preset algorithm may be the SHA-256 algorithm, and the second processing sub-unit performs the SHA-256-based calculation on the target file to obtain a hash value S1, that is, the first character information. The second encryption sub-unit is configured to encrypt the first character information and the target file by using the pre-stored first encryption and decryption key to generate the encrypted authentication file.

Figure 5:
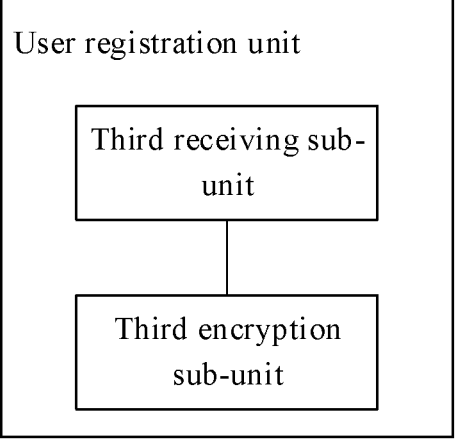
FIG. 5 is a schematic diagram of a structure of a user registration unit according to an embodiment of the present disclosure.

In some examples, in order to satisfy that only a specific user may legally operate the registered display terminal, in the embodiment of the present disclosure, it is necessary to further register the identity information of the user. FIG. 5 is a schematic diagram of a structure of a user registration unit according to an embodiment of the present disclosure. As shown in FIG. 5, the server further includes a user registration unit; the user registration unit includes a third receiving sub-unit and a third encryption sub-unit. The third receiving sub-unit is configured to receive a first authorization identifier of the user to be registered; the first authorization identifier includes an identifier of the user storage device. Here, the user storage device may be a UKey held by a user, and the UKey has a unique device identifier. In addition, the user is also required to provide the identity information, which may include information characterizing that the user's ID or a mobile phone number has been authorized in the platform, and the user identity information and the identifier of the user storage device are stored in association for subsequently sending a preset authorization password. The third encryption sub-unit is configured to encrypt the first authorization identifier by using a pre-stored third encryption and decryption key to obtain the user ciphertext information, and send the user ciphertext information to the display terminal for storage. Here, the third encryption and decryption key may be a randomly generated key, and for example, may be the same as the first encryption and decryption key, and is thus unnecessarily regenerated, and the first encryption and decryption key stored in the device registration stage is directly called. Alternatively, since the third encryption and decryption key is generated randomly, the third encryption and decryption key may be different from the first encryption and decryption key. When the first authorization identifier needs to be encrypted, the third encryption and decryption key is generated randomly, which is not specifically limited in this embodiment of the present disclosure. The first authorization identifier is encrypted by using the pre-stored third encryption and decryption key through the AES encryption algorithm to obtain the user ciphertext information, the user ciphertext information is sent to the MCU of the display terminal for storage. When the user subsequently initiates the user authorization request, the user ciphertext information is received for the user identity authentication.

In some examples, in order to prevent the information displayed by the display terminal from being tampered with by the illegal personnel, in the present disclosure, it is necessary to authenticate the identity of the user to ensure that only authorized users have operating authorities to the display terminal. In the user identity authentication stage, the server further includes a password generation unit; the password generation unit includes a fourth receiving sub-unit, a third decryption sub-unit and a password sending sub-unit. The fourth receiving sub-unit is configured to receive the user ciphertext information sent by the display terminal. The third decryption sub-unit is configured to decrypt the user ciphertext information by using the third encryption and decryption key to obtain a second authorization identifier. Specifically, since the symmetric encryption algorithm is utilized in the present disclosure, the user ciphertext information is generated by encrypting the authorization identifier with the third encryption and decryption key. Here, the third encryption and decryption key is called again to decrypt the user ciphertext information, to obtain the second authorization identifier. The second authorization identifier is a device identifier of the currently detected user storage device. The password sending sub-unit is configured to match the second authorization identifier with the registered first authorization identifier, and send a preset authorization password to a user who succeeds in matching. If the user is a registered user, the registered first authorization identifier is the same as the second authorization identifier, that is, the second authorization identifier is successfully matched with the first authorization identifier. The user identity information associated with the second authorization identifier is obtained, and the preset authorization password is sent to the user by using the user identity information. If the user is an unregistered user, the first authorization identifier is not the same as the second authorization identifier, and the user identity authentication is failed.

Figure 6:
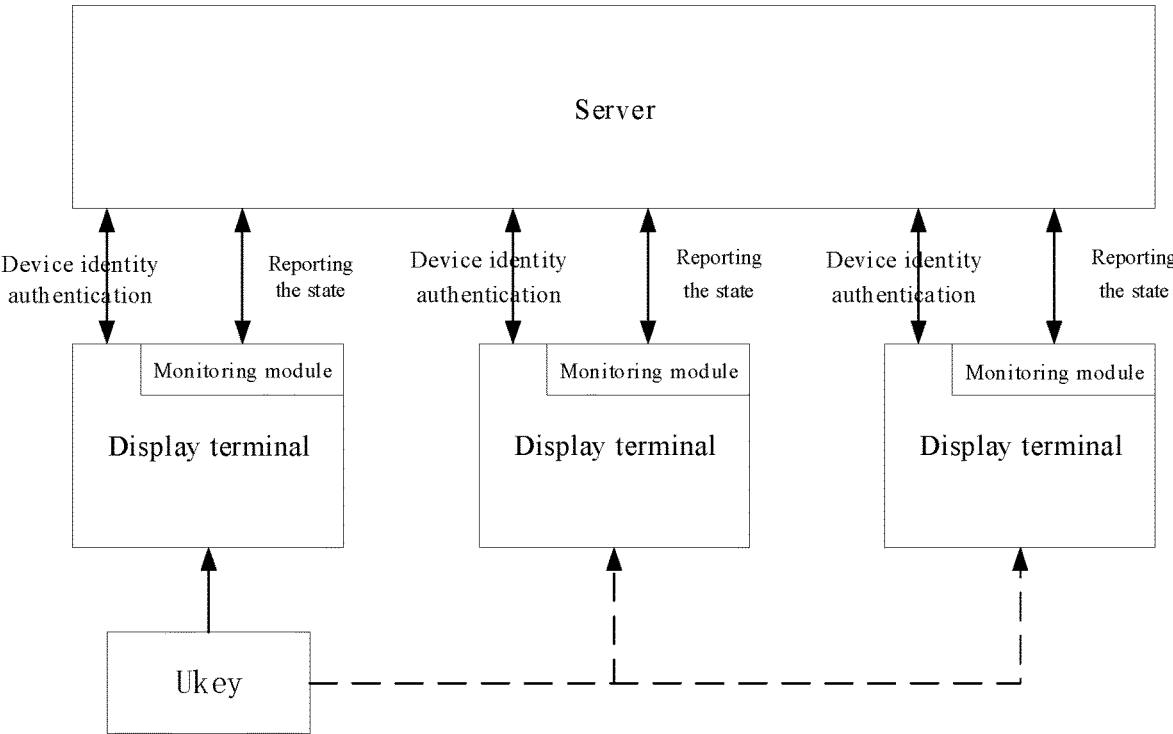
FIG. 6 is a schematic diagram illustrating interaction between a server and a display terminal according to an embodiment of the present disclosure.

In a third aspect, based on the same inventive concept, an embodiment of the present disclosure further provides an information security issuing system, which includes the display terminal and the server. FIG. 6 is a schematic diagram illustrating interaction between a server and a display terminal according to an embodiment of the present disclosure. As shown in FIG. 6, the display terminal includes a monitoring module and a display module; the monitoring module includes a file request unit, an identity authentication unit and a content authentication unit; the server includes a device authentication unit, a file encryption unit and a content monitoring unit.

The device authentication unit is configured to perform the device authentication on the display terminal in response to the device authentication request sent by the display terminal to obtain the device authentication result, and send the device authentication result to the file request unit. The file request unit is configured to receive the device authentication result sent by the device authentication unit and send the file issuing request to the file encryption unit if the device authentication result indicates that the display terminal passes the authentication. The file encryption unit is configured to encrypt the target file to be issued in response to the file issuing request sent by the file request unit to obtain an encrypted authentication file. The identity authentication unit is configured to receive the encrypted authentication file issued by the file encryption unit according to the file issuing request, and authenticate the identity information of the data content in the encrypted authentication file. The display module is configured to display the data content if the identity authentication is passed. The content authentication unit is configured to determine whether the data content is correct based on the first image displayed by the display module. The content monitoring unit is configured to receive the authentication result of the data content sent by the content authentication unit and monitor whether the data content is correct.

For specific implementation of the units, reference may be made to the embodiments of the units of the display terminal in the first aspect and the embodiments of the units of the server in the second aspect, and repeated descriptions are omitted here.

According to the information security issuing system provided by the embodiment of the present disclosure, through an interaction between the display terminal and the server, the identity authentication is performed on the display terminal to which the transmitted file is received by using the device authentication unit in the device authentication stage, so that the display terminal used for receiving the transmitted file can be ensured to be the display terminal which has passed the device authentication, and the transmitted file is prevented from being sent to an illegal display terminal for display. The file encryption unit encrypts the target file to be issued, which can realize the secret transmission of information. In the identity authentication stage, the identity information of the transmitted file is authenticated by the identity authentication unit, so that the basic attribute characteristics of the transmitted file are prevented from being tampered with. In the content authentication stage, the authentication of the content of the transmitted file is realized by the content authentication unit, so that the actual display information of the transmitted file on the display module is prevented from being tampered with. The content monitoring unit may monitor the data content displayed by the display terminal in real time. Therefore, the information security issuing system provided by the embodiment of the present disclosure can effectively solve the security problem in the information issuing process through the multi-aspect authentication and monitoring in the information transmission process.

In some examples, the server interacts with the display terminal to realize the identity authentication of the transmitted file. Specifically, the file encryption unit includes a labeling sub-unit, a second processing sub-unit and a second encryption sub-unit; the identity authentication unit includes a first decryption sub-unit, a first processing sub-unit and a character comparison sub-unit. The labeling sub-unit is configured to replace the display information of each frame of the second image, in the second preset region, in the file to be issued with the pre-stored verification information in response to the file issuing request sent by the file request unit, and take the replaced file to be issued as the target file. The second processing sub-unit is configured to process the target file through the preset algorithm to obtain the first character information corresponding to the target file. The second encryption sub-unit is configured to encrypt the first character information and the target file by using the pre-stored first encryption and decryption key, to generate an encrypted authentication file. The first decryption sub-unit is configured to receive the encrypted authentication file and decrypt the encrypted authentication file by using the first encryption and decryption key to obtain a decrypted authentication file; the decrypted authentication file includes the data content and the first character information. The first processing sub-unit is configured to process the data content through the preset algorithm to obtain the second character information corresponding to the data content. The character comparison sub-unit is configured to compare the first character information with the second character information, and determine whether the identity information of the data content passes the authentication according to a comparison result.

For specific implementation of the sub-units, reference may be made to the embodiments of the sub-units of the file encryption unit of the server in the second aspect and the embodiments of the sub-units of the identity authentication unit of the display terminal in the first aspect, and repeated descriptions are omitted here.

In some examples, the server interacts with the display terminal to realize the content authentication of the transmitted file. Specifically, the display terminal further includes the first processing unit and the image sensor integrated on the display module; and the content authentication unit of the display terminal includes the first receiving sub-unit and the content authentication sub-unit. The image sensor is configured to acquire a sub-image of the first image displayed by the display module in the first preset region. The first processing unit is configured to receive the data content sent by the identity authentication unit and send the data content to the display module for display. The first receiving sub-unit is configured to receive the sub-image transmitted by the image sensor. The content authentication sub-unit is configured to verify the display information of the sub-image according to the pre-stored verification information and determine whether the data content is correct. The content monitoring unit is configured to receive an authentication result of the data content sent by the display terminal and monitor whether the data content is correct.

For specific implementation of the image sensor, the units, and the sub-units, reference may be made to specific embodiments of the image sensor, the first processing unit, and sub-units in the content authentication unit of the display terminal in the first aspect, and specific embodiments of the content monitoring unit of the server in the second aspect, and repeated descriptions are omitted here.

In some examples, the server interacts with the display terminal to realize a device identity authentication. Specifically, the display terminal further includes the device authentication request unit; and the device authentication unit of the server includes the second decryption sub-unit and the identifier comparison sub-unit. The device authentication request unit is configured to transmit the device authentication request to the server in a case where the received device authentication information indicates that the authentication of the display terminal is failed; the device authentication request carries the device ciphertext information of the display terminal. The second decryption sub-unit is configured to extract the device ciphertext information carried in the device authentication request in response to the device authentication request sent by the display terminal, and decrypt the device ciphertext information by using the second encryption and decryption key to obtain the second device identifier of the display terminal. The identifier comparison sub-unit is configured to compare the second device identifier with the pre-stored first device identifier of the registered display terminal to obtain the device authentication result, and feed the device authentication result back to the display terminal.

For specific implementation of the sub-units, reference may be made to specific embodiments of the device authentication request unit of the display terminal in the first aspect and specific embodiments of the sub-units of the device authentication unit of the server in the second aspect, and repeated descriptions are omitted here.

In some examples, the server interacts with the display terminal to realize the user identity authentication. Specifically, as shown in FIG. 6, the information security issuing system further includes the user storage device; the display terminal further includes the second processing unit; the server further includes the password generation unit; the password generation unit includes the fourth receiving sub-unit, the third decryption sub-unit and the password sending sub-unit. The user storage device is in communication connection with the display terminal and is configured to initiate a user authorization request to the display terminal. The second processing unit is configured to determine the first authority for granting the user to start or close the display terminal in response to the user authorization request initiated by the user storage device, and send the user ciphertext information to the server. The display module is further configured to display a password input window when the user storage device initiates the user authorization request. The fourth receiving sub-unit is configured to receive the user ciphertext information sent by the display terminal. The third decryption sub-unit is configured to decrypt the user ciphertext information by using the third encryption and decryption key to obtain the second authorization identifier. The password sending sub-unit is configured to match the second authorization identifier with the registered first authorization identifier, and send the preset authorization password to a user who succeeds in matching. The display module is further configured to display the password input by the user in response to the input operation by the user. The second processing unit is further configured to determine that the second authority for granting the user to operate the preset function of the display terminal when the password input by the user matches the preset authorization password.

Figure 7:
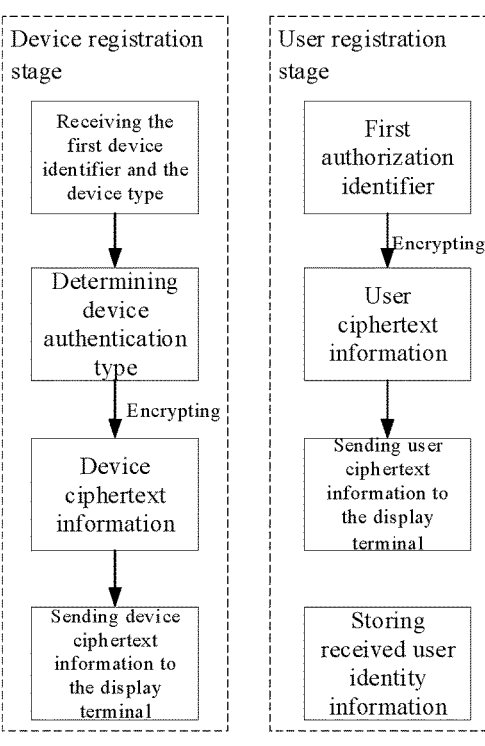
FIG. 7 is a schematic flow chart of information interaction according to an embodiment of the present disclosure.
Figure 7:
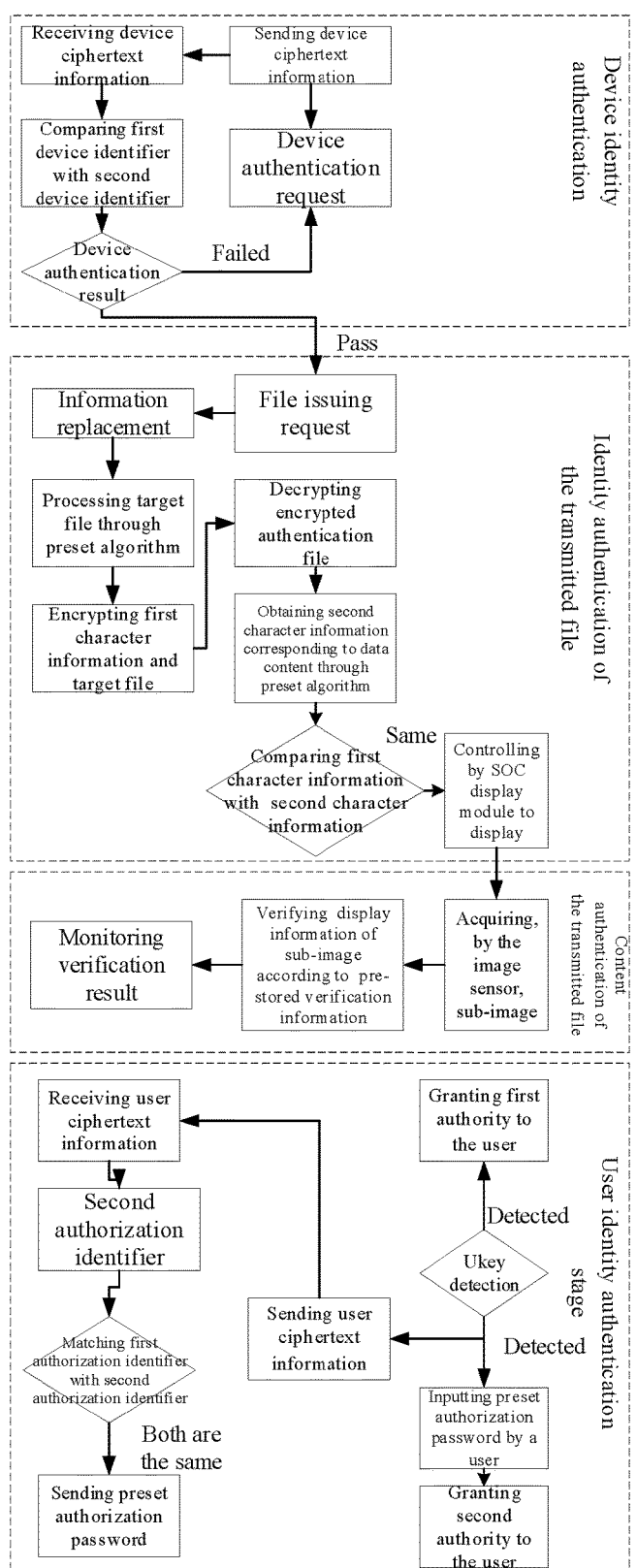

In a fourth aspect, based on the same inventive concept, an embodiment of the present disclosure further provides an information security issuing method, where an execution subject for the method is the information security issuing system. FIG. 7 is a schematic flow chart of information interaction according to an embodiment of the present disclosure. As shown in FIG. 7, the method includes six stages, where the server side includes a device registration stage and a user registration stage. The server interacts with the display terminal to realize the device identity authentication, the identity authentication of the transmitted file, the content authentication of the transmitted file and the user identity authentication. The display terminal includes the monitoring module, the SOC and the display module.

In the device registration stage, specifically, the first device identifier and the device type of the terminal to be registered are received; the device authentication type selected by a user is determined; the first device identifier, the device type and the device authentication type are encrypted by utilizing the pre-stored second encryption and decryption key to obtain the device ciphertext information;

and the device ciphertext information is sent to the registered display terminal for storage.

In the user registration stage, specifically, the first authorization identifier of a user to be registered is received; the first authorization identifier includes the user identity information and the identifier of the user storage device; and the first authorization identifier is encrypted by using the pre-stored third encryption and decryption key to obtain the user ciphertext information, and the user ciphertext information is sent to the display terminal for storage.

In the device identity authentication, the identity authentication of the transmitted file and the content authentication of the transmitted file, specifically, the monitoring module sends the device authentication request to the server; the device authentication request carries the device ciphertext information of the display terminal. The server receives the device ciphertext information and decrypts the device ciphertext information by using the second encryption and decryption key to obtain the second device identifier of the display terminal. The second device identifier is compared with the pre-stored first device identifier of the registered display terminal to obtain a device authentication result, and the device authentication result is fed back to the display terminal. The monitoring module sends the file issuing request to the server when it is determined that the device authentication result indicates that the display terminal passes the authentication. The server replaces the display information, in the second preset region, of each frame of the second image in the file to be issued with the pre-stored verification information in response to the file issuing request, and the replaced file to be issued serves as the target file; then, the target file is processed through the preset algorithm to obtain the first character information corresponding to the target file; and then, the first character information and the target file are encrypted by utilizing the pre-stored first encryption and decryption key to generate the encrypted authentication file. The monitoring module receives the encrypted authentication file and decrypts the encrypted authentication file by using the first encryption and decryption key to obtain a decrypted authentication file; the decrypted authentication file includes the data content and the first character information; then, the data content is processed through the preset algorithm to obtain the second character information corresponding to the data content; then, the first character information is compared with the second character information, and it is determined whether the identity information of the data content passes the authentication or not according to the comparison result; then, the data content passing the identity authentication is sent to the SOC, which controls the display module to play the data content; and then, the monitoring module receives the sub-image sent by the image sensor, verifies the display information of the sub-image according to the pre-stored verification information, determines whether the data content is correct or not, and sends the content authentication result of the data content to the server so that the server monitors the received authentication result of the data content.

In the user identity authentication stage, specifically, the SOC detects the user storage device, determines the first authority for granting the user to start or close the display terminal, and controls the monitoring module to send the user ciphertext information to the server; and the SOC controls the display module to display the password input window. The server decrypts the received user ciphertext information by using the third encryption and decryption key to obtain the second authorization identifier; and then, the second authorization identifier is matched with the registered first authorization identifier, and the preset authorization password is sent to the successfully matched user. Then, the SOC receives the password input by the user, and determines the second authority for granting the user to operate the preset function of the display terminal when the password input by the user is matched with the preset authorization password.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and essence of the present disclosure, and such changes and modifications also fall within the scope of the present disclosure.

What is claimed is:

1. A display terminal, comprising a monitoring module and a display module; wherein the monitoring module comprises a file request unit, an identity authentication unit and a content authentication unit;

the file request unit is configured to receive a device authentication result sent by the server and send a file issuing request to the server in response to the device authentication result indicating that the display terminal is successfully authenticated;

the identity authentication unit is configured to receive an encrypted authentication file issued by the server according to the file issuing request, and authenticate identity information of data content in the encrypted authentication file;

the display module is configured to display the data content in response to the identity authentication being passed; and the content authentication unit is configured to determine whether the data content is correct based on a first image displayed by the display module.

2. The display terminal of claim 1, wherein the identity authentication unit comprises a first decryption sub-unit, a first processing sub-unit, and a character comparison sub-unit;

the first decryption sub-unit is configured to receive the encrypted authentication file, and decrypt the encrypted authentication file by using a pre-stored first encryption and decryption key to obtain a decrypted authentication file; the decrypted authentication file comprises the data content and first character information;

the first processing sub-unit is configured to process the data content through a preset algorithm to obtain second character information corresponding to the data content; and the character comparison sub-unit is configured to compare the first character information with the second character information, and determine whether the identity information of the data content passes the authentication according to a comparison result.

3. The display terminal of claim 1, wherein the display terminal further comprises a first processing unit and an image sensor integrated on the display module;

the image sensor is configured to acquire a sub-image, displayed in a first preset region, of the first image displayed by the display module; and the first processing unit is configured to receive the data content sent by the identity authentication unit and send the data content to the display module for display.

4. The display terminal of claim 3, wherein the content authentication unit comprises a first receiving sub-unit and a content authentication sub-unit;

the first receiving sub-unit is configured to receive the sub-image sent by the image sensor; and the content authentication sub-unit is configured to verify the display information of the sub-image according to pre-stored verification information and determine whether the data content is correct.

5. The display terminal of claim 1, wherein the display terminal further comprises a second processing unit;

the second processing unit is configured to determine a first authority for granting the user to start or close the display terminal in response to a user authorization request initiated by a user storage device, send pre-stored user ciphertext information to the server, and determine a second authority for granting the user to operate a preset function of the display terminal in response to a password input by the user being matched with a preset authorized password; and the display module is further configured to display a password input window in response to the user storage device initiating the user authorization request; and display the password input by the user in response to the input operation of the user.

6. The display terminal of claim 1, wherein the monitoring module further comprises a charging unit, a battery and a communication unit;

the charging unit is configured to charge the battery;

the battery is configured to supply power to the image sensor, the file request unit, the identity authentication unit, the content authentication unit and the communication unit in the display terminal; and the communication unit is configured to communicate with the server.

7. The display terminal of claim 1, wherein the display terminal further comprises a device authentication request unit; and the device authentication request unit is configured to transmit a device authentication request to the server in response to the received device authentication information indicating that the authentication of the display terminal is failed; the device authentication request carries device ciphertext information of the display terminal.

8. A server, comprising a device authentication unit, a file encryption unit, and a content monitoring unit; wherein the device authentication unit is configured to perform a device authentication on a display terminal in response to a device authentication request sent by the display terminal to obtain a device authentication result, and feed the device authentication result back to the display terminal;

the file encryption unit is configured to encrypt a target file to be issued in response to a file issuing request sent by the display terminal to obtain an encrypted authentication file; and the content monitoring unit is configured to receive an authentication result of a data content sent by the display terminal and monitor whether the data content is correct.

9. The server of claim 8, wherein the server further comprises a device registration unit; the device registration unit comprises a second receiving sub-unit, a type selection sub-unit and a first encryption sub-unit;

the second receiving sub-unit is configured to receive a first device identifier and a device type of a terminal to be registered;

the type selection sub-unit is configured to determine a device authentication type selected by a user; and the first encryption sub-unit is configured to encrypt the first device identifier, the device type and the device authentication type by using a pre-stored second encryption and decryption key to obtain device ciphertext information, serve the terminal to be registered as a registered display terminal, and send the device ciphertext information to the registered display terminal for storage.

10. The server of claim 9, wherein the device authentication unit comprises a second decryption sub-unit and an identifier comparison sub-unit;

the second decryption sub-unit is configured to extract the device ciphertext information carried in the device authentication request in response to the device authentication request sent by the display terminal, and decrypt the device ciphertext information by using the second encryption and decryption key to obtain a second device identifier of the display terminal; and the identifier comparison sub-unit is configured to compare the second device identifier with the pre-stored first device identifier of the registered display terminal to obtain a device authentication result, and feed the device authentication result back to the display terminal.

11. The server of claim 9, wherein the file encryption unit comprises a labeling sub-unit, a second processing sub-unit, and a second encryption sub-unit; the device registration unit further comprises a key generation sub-unit;

the key generation sub-unit is configured to generate a first encryption and decryption key according to the first device identifier of the registered display terminal, and send the first encryption and decryption key to the registered display terminal for storage;

the labeling sub-unit is configured to replace display information, in a second preset region, of each frame of a second image in the file to be issued with pre-stored verification information in response to the file issuing request sent by the display terminal, and take the replaced file to be issued as a target file;

the second processing sub-unit is configured to process the target file through a preset algorithm to obtain first character information corresponding to the target file; and the second encryption sub-unit is configured to encrypt the first character information and the target file by using the pre-stored first encryption and decryption key to generate an encrypted authentication file.

12. The server of claim 8, wherein the server further comprises a user registration unit; the user registration unit comprises a third receiving sub-unit and a third encryption sub-unit;

the third receiving sub-unit is configured to receive a first authorization identifier of a user to be registered; the first authorization identifier comprises an identifier of a user storage device; and the third encryption sub-unit is configured to encrypt the first authorization identifier by using a pre-stored third encryption and decryption key to obtain user ciphertext information, and send the user ciphertext information to the display terminal for storage.

13. The server of claim 12, wherein the server further comprises a password generation unit; the password generation unit comprises a fourth receiving sub-unit, a third decryption sub-unit and a password sending sub-unit;

the fourth receiving sub-unit is configured to receive the user ciphertext information sent by the display terminal;

the third decryption sub-unit is configured to decrypt the user ciphertext information by using the third encryption and decryption key to obtain a second authorization identifier; and the password sending sub-unit is configured to match the second authorization identifier with the registered first authorization identifier, and send a preset authorization password to a user who succeeds in matching.

14. An information security issuing system, comprising a display terminal and a server; wherein the display terminal comprises a monitoring module and a display module; the monitoring module comprises a file request unit, an identity authentication unit and a content authentication unit; the server comprises a device authentication unit, a file encryption unit and a content monitoring unit;

the device authentication unit is configured to perform a device authentication on the display terminal in response to a device authentication request sent by the display terminal to obtain a device authentication result, and send the device authentication result to the file request unit;

the file request unit is configured to receive the device authentication result sent by the device authentication unit and send a file issuing request to the file encryption unit in response to the device authentication result indicating that the display terminal is successfully authenticated;

the file encryption unit is configured to encrypt a target file to be issued in response to the file issuing request sent by the file request unit to obtain an encrypted authentication file;

the identity authentication unit is configured to receive the encrypted authentication file issued by the file encryption unit according to the file issuing request, and authenticate an identity information of a data content in the encrypted authentication file;

the display module is configured to display the data content in response to the identity authentication being passed;

the content authentication unit is configured to determine whether the data content is correct based on a first image displayed by the display module; and the content monitoring unit is configured to receive a authentication result of the data content sent by the content authentication unit and monitor whether the data content is correct.

15. The information security issuing system of claim 14, wherein the file encryption unit comprises a labeling sub-unit, a second processing sub-unit, and a second encryption sub-unit; and the identity authentication unit comprises a first decryption sub-unit, a first processing sub-unit and a character comparison sub-unit;

the labeling sub-unit is configured to replace display information, in a second preset region, of each frame of second image in the file to be issued with pre-stored verification information in response to the file issuing request sent by the file request unit, and serve the replaced file to be issued as the target file;

the second processing sub-unit is configured to process the target file through a preset algorithm to obtain first character information corresponding to the target file;

the second encryption sub-unit is configured to encrypt the first character information and the target file by using a pre-stored first encryption and decryption key to generate the encrypted authentication file;

the first decryption sub-unit is configured to receive the encrypted authentication file, and decrypt the encrypted authentication file by using the first encryption and decryption key to obtain a decrypted authentication file; the decrypted authentication file comprises the data content and the first character information;

the first processing sub-unit is configured to process the data content through a preset algorithm to obtain second character information corresponding to the data content; and the character comparison sub-unit is configured to compare the first character information with the second character information, and determine whether the identity information of the data content passes the authentication according to a comparison result.

16. The information security issuing system of claim 14, wherein the information security issuing system further comprises a user storage device; the user storage device is in communication connection with the display terminal and is configured to initiate a user authorization request to the display terminal.

\* \* \* \* \*